United States Patent
Le et al.

(10) Patent No.: US 12,412,252 B2
(45) Date of Patent: Sep. 9, 2025

(54) SYSTEM AND METHOD FOR SCENE-ADAPTIVE DENOISE SCHEDULING AND EFFICIENT DEGHOSTING

(71) Applicant: Samsung Electronics Co., Ltd., Suwon-si (KR)

(72) Inventors: Nguyen Thang Long Le, Garland, TX (US); Tyler Luu, Richardson, TX (US); Hamid R. Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 18/149,714

(22) Filed: Jan. 4, 2023

(65) Prior Publication Data

US 2024/0221130 A1    Jul. 4, 2024

(51) Int. Cl.
*G06T 5/70*    (2024.01)
*G06T 3/18*    (2024.01)
(Continued)

(52) U.S. Cl.
CPC ............. *G06T 5/70* (2024.01); *G06T 3/18* (2024.01); *G06T 5/50* (2013.01); *G06T 5/80* (2024.01); *G06T 2207/20212* (2013.01)

(58) Field of Classification Search
CPC .... G06T 5/70; G06T 3/18; G06T 5/50; G06T 5/80; G06T 2207/20212; G06T 7/20;
(Continued)

(56) References Cited

U.S. PATENT DOCUMENTS

| 10,477,185 B2 | 11/2019 | Barron et al. |
| 10,944,914 B1 | 3/2021 | Le et al. |

(Continued)

FOREIGN PATENT DOCUMENTS

| CN | 104272377 A | * | 1/2015 | ........... G06Q 10/103 |
| CN | 106797437 B | * | 8/2021 | ............... G06T 1/20 |
| CN | 112233032 B | | 4/2022 | |

OTHER PUBLICATIONS

International Search Report and Written Opinion of the International Searching Authority dated Oct. 11, 2023 in connection with International Patent Application No. PCT/KR2023/009219, 9 pages.

(Continued)

*Primary Examiner* — Jose L Couso

(57) ABSTRACT

A method includes generating alignment maps for a first image frame having a first exposure level and a second image frame having a second exposure level different than the first exposure level. The method also includes generating, for the second image frame and a third image frame having a third exposure level different than the first and second exposure levels, shadow maps, saturation maps, and multi-exposure (ME) motion maps based on the alignment maps. The method further includes determining, based on the shadow maps, saturation maps, and ME motion maps, whether to perform machine learning-based denoising and, if so, on which image frame(s) to perform the machine learning-based denoising. In addition, the method includes updating at least one saturation map and at least one ME motion map for at least one of the second and third image frames depending on the image frame(s) on which the denoising is to be performed.

20 Claims, 14 Drawing Sheets

(51) Int. Cl.
*G06T 5/50* (2006.01)
*G06T 5/80* (2024.01)

(58) Field of Classification Search
CPC . G06T 2207/10016; G06T 2207/20081; G06T 2207/20221; G06T 5/60; G06T 5/40; G06T 5/90; G06T 5/73; G06T 7/215; G06T 2207/20208; G06T 2207/10144; G06T 2207/20182; G06T 2207/20201; G06T 7/38; G06T 3/4076; G06T 3/4046; G06T 9/002; G06T 2207/20076; G06T 2207/20084; H04N 23/73; H04N 23/60; H04N 23/81; H04N 23/843; H04N 23/133; H04N 23/46; H04N 23/741; H04N 23/951; H04N 5/144; H04N 25/57; H04N 25/58; H04N 23/265; H04N 23/682; G06V 10/28; G06V 10/507; G06V 10/74; G06V 10/454; G06V 10/54; G06V 10/774; G06V 10/82; G06V 20/41; G06V 30/18057; G06V 20/698; G06V 30/19173; G06N 3/02; G06N 3/08–088; G06N 3/0445; G06N 3/0454; G06N 3/4046; G06N 7/00; G06N 7/01; G06N 20/00; G06K 7/1482; G06F 18/214; G06F 18/22; G06F 18/241; G06F 18/24; G06F 18/2411; G06F 18/2415; Y10S 128/925
See application file for complete search history.

(56) References Cited

U.S. PATENT DOCUMENTS

| | | | |
|---|---|---|---|
| 11,062,436 | B2 | 7/2021 | Pekkucuksen et al. |
| 11,094,039 | B1* | 8/2021 | Wong ................. G06T 5/50 |
| 11,107,205 | B2 | 8/2021 | Hu et al. |
| 11,200,653 | B2 | 12/2021 | Tong et al. |
| 11,290,655 | B1 | 3/2022 | Kim |
| 11,563,898 | B2 | 1/2023 | Patel et al. |
| 12,086,956 | B2 | 9/2024 | Pham et al. |
| 2011/0052095 | A1* | 3/2011 | Deever ............. H04N 25/133 |
| | | | 382/300 |
| 2016/0093029 | A1* | 3/2016 | Micovic ............... G06T 3/14 |
| | | | 348/229.1 |
| 2020/0084429 | A1 | 3/2020 | Barron et al. |
| 2020/0265567 | A1 | 8/2020 | Hu et al. |
| 2020/0329187 | A1 | 10/2020 | Huang |
| 2021/0314474 | A1 | 10/2021 | Yang et al. |
| 2022/0138964 | A1 | 5/2022 | Gintsburg et al. |
| 2022/0392032 | A1* | 12/2022 | Mallick ............. G06V 10/82 |
| 2024/0185390 | A1* | 6/2024 | Jiang ................. G06T 5/73 |
| 2024/0193789 | A1* | 6/2024 | Bandwar ........... H04N 23/682 |

OTHER PUBLICATIONS

Xu et al., "Multi-Exposure Image Fusion Techniques: A Comprehensive Review," Remote Sensing 14, No. 3, Feb. 2022, 31 pages.

* cited by examiner

SYSTEM AND METHOD FOR SCENE-ADAPTIVE DENOISE SCHEDULING AND EFFICIENT DEGHOSTING

TECHNICAL FIELD

This disclosure relates generally to imaging systems. More specifically, this disclosure relates to a system and method for scene-adaptive denoise scheduling and efficient deghosting.

BACKGROUND

Many mobile electronic devices, such as smartphones and tablet computers, include cameras that can be used to capture still and video images. Such images can vary greatly based on the type of scene (such as day, night, indoor, outdoor, and the like). Traditionally, different image processing pipelines are used for different scene types. For example, one image processing pipeline might be used for nighttime scenes, while a different image processing pipeline might be used for daytime scenes. If a particular image processing pipeline is used for a different type of image, the resulting image may be less than satisfactory, such as when an over-filtered image is produced.

SUMMARY

This disclosure provides a system and method for scene-adaptive denoise scheduling and efficient deghosting.

In a first embodiment, a method includes generating alignment maps for a first image frame having a first exposure level and a second image frame having a second exposure level different than the first exposure level. The method also includes generating, for the second image frame and a third image frame having a third exposure level different than the first and second exposure levels, shadow maps, saturation maps, and multi-exposure (ME) motion maps based on the alignment maps. The method further includes determining, based on the shadow maps, the saturation maps, and the ME motion maps, whether to perform machine learning-based denoising and, if so, on which image frame or frames to perform the machine learning-based denoising. In addition, the method includes updating at least one of the saturation maps and at least one of the ME motion maps for at least one of the second and third image frames depending on the image frame or frames on which the machine learning-based denoising is to be performed.

In a second embodiment, an electronic device includes at least one imaging sensor configured to capture multiple image frames of a scene. The electronic device also includes at least one processing device configured to generate alignment maps for a first image frame having a first exposure level and a second image frame having a second exposure level different than the first exposure level. The at least one processing device is also configured to generate, for the second image frame and a third image frame having a third exposure level different than the first and second exposure levels, shadow maps, saturation maps, and ME motion maps based on the alignment maps. The at least one processing device is further configured to determine, based on the shadow maps, the saturation maps, and the ME motion maps, whether to perform machine learning-based denoising and, if so, on which image frame or frames to perform the machine learning-based denoising. In addition, the at least one processing device is configured to update at least one of the saturation maps and at least one of the ME motion maps for at least one of the second and third image frames depending on the image frame or frames on which the machine learning-based denoising is to be performed.

In a third embodiment, a non-transitory machine-readable medium contains instructions that when executed cause at least one processor of an electronic device to generate alignment maps for a first image frame having a first exposure level and a second image frame having a second exposure level different than the first exposure level. The medium also contains instructions that when executed cause the at least one processor to generate, for the second image frame and a third image frame having a third exposure level different than the first and second exposure levels, shadow maps, saturation maps, and ME motion maps based on the alignment maps. The medium further contains instructions that when executed cause the at least one processor to determine, based on the shadow maps, the saturation maps, and the ME motion maps, whether to perform machine learning-based denoising and, if so, on which image frame or frames to perform the machine learning-based denoising. In addition, the medium contains instructions that when executed cause the at least one processor to update at least one of the saturation maps and at least one of the ME motion maps for at least one of the second and third image frames depending on the image frame or frames on which the machine learning-based denoising is to be performed.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
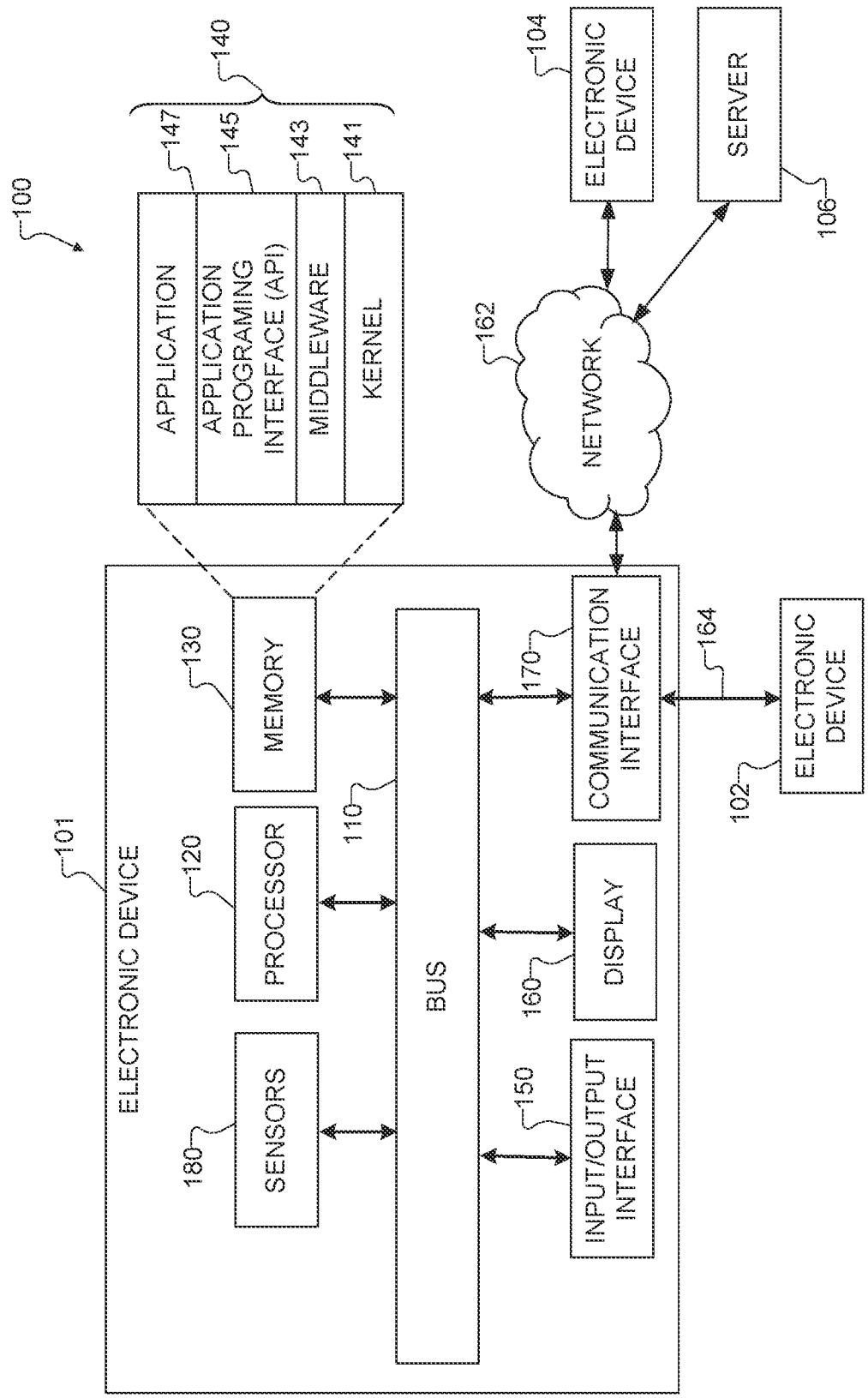
FIG. 1 illustrates an example network configuration including an electronic device according to this disclosure.

FIGS. 1 through 11, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, many mobile electronic devices, such as smartphones and tablet computers, include cameras that can be used to capture still and video images. Such images can vary greatly based on the type of scene (such as day, night, indoor, outdoor, and the like). Traditionally, different image processing pipelines are used for different scene types. For example, one image processing pipeline might be used for nighttime scenes, while a different image processing pipeline might be used for daytime scenes. If a particular image processing pipeline is used for a different type of image, the resulting image may be less than satisfactory, such as when an over-filtered image is produced. Also, many image processing pipelines result in fragmentations of an imaging solution and inconsistent behavior in a camera.

Since they are designed specifically for certain scene types, conventional image processing pipelines offer limited freedom in reconfiguration to adapt to different scenes. For example, consider a nighttime image pipeline. In a conventional nighttime image pipeline, captured frames are aligned, and a reference frame is selected based on frame metadata. The selected reference frame is input to a denoising process. Deghosting occurs after denoising, using the latter output as a reference. Single-exposure (SE) blending proceeds with motion maps output from the deghosting process, and multi-exposure (ME) deghosting and blending also occur in sequence. While this nighttime image pipeline configuration may be suitable for high-noise nighttime scenes, such a pipeline can result in over-filtering when applied to daytime scenes. Also, some denoising processes, such as artificial intelligence (AI)-based denoising processes, are computationally intensive. Such processes can be suppressed for longer-exposure captures in nighttime scenes. However, AI denoising can be a performance bottleneck for daytime scenes where short-exposure captures are performed. This can result in overall longer processing and thus longer shot-to-shot times.

This disclosure provides various techniques for scene-adaptive denoise scheduling and efficient deghosting. As described in more detail below, the disclosed systems and methods provide a unified image processing pipeline that is adaptable for many natural scenes, including both daytime scenes and nighttime scenes. The disclosed embodiments are capable of processing scenes captured by a camera, regardless of scene lighting conditions, exposure levels, and the like. Compared to prior techniques, the disclosed embodiments can reduce motion blur, ghost artifacts, and detail loss, which results in overall improved picture quality. In addition, the disclosed embodiments can reduce image processing times by efficient scheduling and performance of denoising operations, thereby improving user experiences. Note that while some of the embodiments discussed below are described in the context of use in consumer electronic devices (such as smartphones), this is merely one example, and it will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for scene-adaptive denoise scheduling and efficient deghosting.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for scene-adaptive denoise scheduling and efficient deghosting as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for scene-adaptive denoise scheduling and efficient deghosting.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
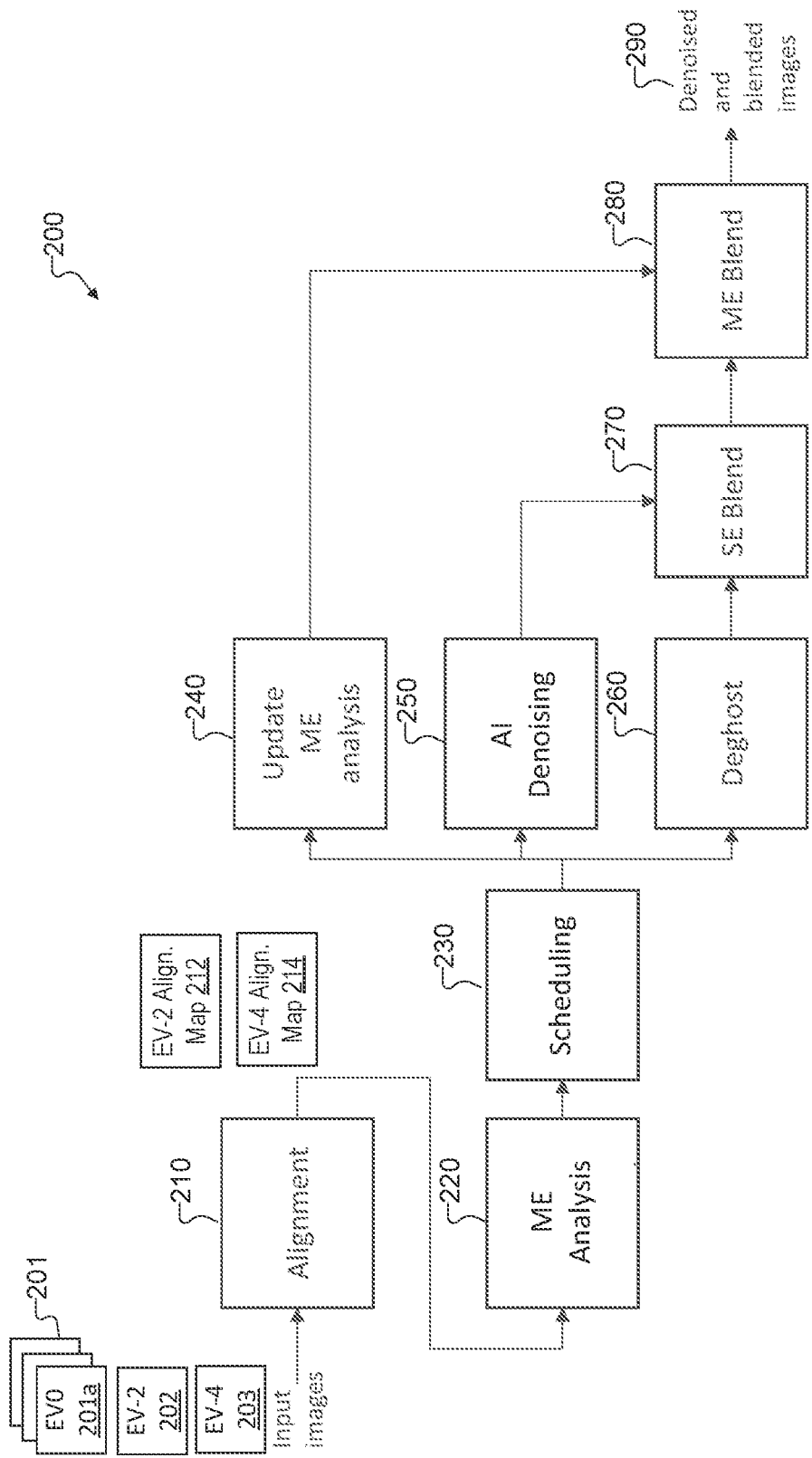
FIG. 2 illustrates an example process for scene-adaptive denoise scheduling and efficient deghosting according to this disclosure.

FIG. 2 illustrates an example process 200 for scene-adaptive denoise scheduling and efficient deghosting according to this disclosure. For ease of explanation, the process 200 is described as being performed using one or more components of the network configuration 100 of FIG. 1 described above, such as the electronic device 101. However, this is merely one example, and the process 200 could be performed using any other suitable device(s) and in any other suitable system(s).

As shown in FIG. 2, the electronic device 101 obtains multiple input images 201-203 of a scene. For example, the electronic device 101 can obtain the input images 201-203 in a burst capture operation, meaning the input images 201-203 can be obtained in rapid succession or at or near the same time. The capture operation may be performed in response to an event, such as a user actuating a shutter control or image capture control. In some embodiments, the input images 201-203 are captured using a common imaging sensor 180 of the electronic device 101. In other embodiments, the input images 201-203 are captured using multiple imaging sensors 180 of the electronic device 101.

The input images 201-203 have different exposure values (EVs) corresponding to different exposure levels. In photography, EV is a number that combines aperture (also known as f-number) and shutter speed. The EV represents how much light is in the scene and thus the exposure level. EV0 corresponds to an exposure time of one second and an aperture of f/1.0. In some embodiments, the input images 201-203 include multiple EV0 images 201, an EV-2 image 202, and an EV-4 image 203. In subsequent operations, one of the EV0 images 201 may be selected as a reference image. Of course, this is merely one example, and different numbers of input images at different exposure levels are possible and within the scope of this disclosure.

The electronic device 101 performs an alignment operation 210 on one or more of the input images 201-203. Alignment generally refers to aligning different image frames so that common points in the image frames are aligned. This may be useful or desirable since later blending operations may be more successful when the image frames are well-aligned. The alignment operation 210 is performed to generate one or more alignment maps, which represent alignment differences between the input images 201-203. In some embodiments, the electronic device 101 performs the alignment operation 210 to generate an EV-2 alignment map 212 (representing differences between the reference EV0 image 201a and the EV-2 image 202) and an EV-4 alignment map 214 (representing differences between the reference EV0 image 201a and the EV-4 image 203). Any suitable technique or algorithm can be used in the alignment operation 210.

Figure 3:
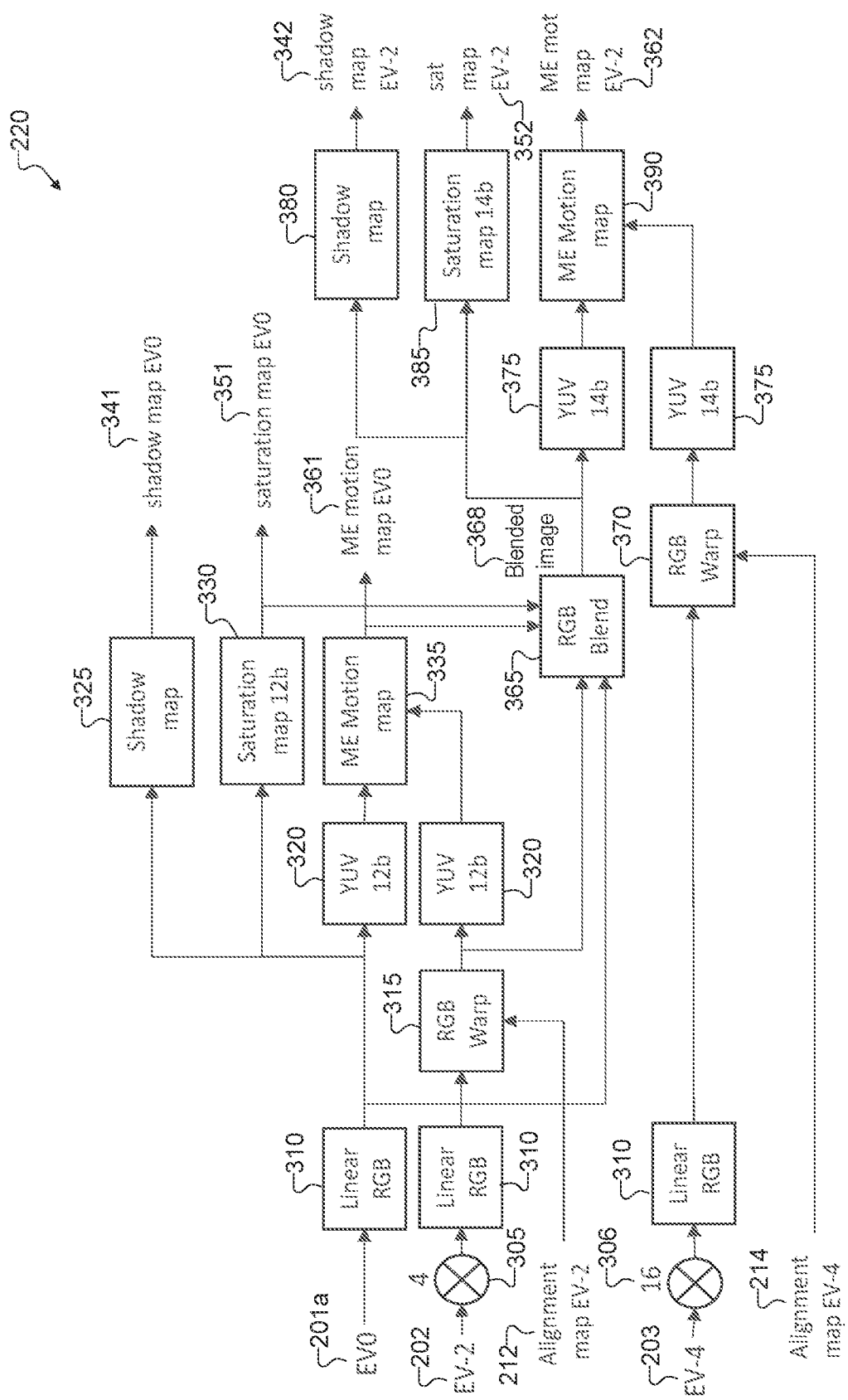
FIG. 3 illustrates example details of a multi-exposure (ME) analysis operation in the process of FIG. 2 according to this disclosure.

After generation of the alignment maps 212 and 214, the electronic device 101 performs a multi-exposure (ME) analysis operation 220 to generate shadow maps, saturation maps, and ME motion maps for the reference EV0 image 201a and the EV-2 image 202. FIG. 3 illustrates example details of the ME analysis operation 220 according to this disclosure. As shown in FIG. 3, the ME analysis operation 220 receives the input images 201-203 and the alignment maps 212 and 214 as inputs. In the ME analysis operation 220, the electronic device 101 performs multiplication operations 305 and 306 on the EV-2 image 202 and the EV-4 image 203, respectively, in order to substantially equalize the brightness levels among the input images 201-203. The multiplication operations 305 and 306 can be pixel-by-pixel multiplication operations, where each pixel of the image 202 or 203 is multiplied by a multiplication value. In this particular example, the EV-2 image 202 is multiplied by four in the multiplication operation 305, and the EV-4 image 203 is multiplied by sixteen in the multiplication operation 306.

Once the electronic device 101 performs the multiplication operations 305 and 306 to equalize the brightness levels among the input images 201-203, the electronic device 101 performs a linear red-green-blue (RGB) conversion operation 310 on each of the input images 201-203. In some embodiments, when the input images 201-203 are first received, the input images 201-203 are in the Bayer domain, and the electronic device 101 performs the linear RGB conversion operation 310 to convert the input images 201-203 into the RGB domain. For example, in some cases, the linear RGB conversion operation 310 may include the following operations.

$$R = R_B$$
$$G = \frac{(G_{B1} + G_{B2})}{2}$$
$$B = B_B$$

Here, R, G, and B represent the red, green, and blue values of each pixel in the RGB domain, and $R_B$, $G_{B1}$, $G_{B2}$, and $B_B$ represent the red, first green, second green, and blue values of each pixel in the Bayer domain. Of course, these operations are examples, and other suitable conversion operations could be used.

Once the EV-2 image 202 has been converted to the RGB domain, the electronic device 101 performs an RGB warp operation 315 on the EV-2 image 202. The RGB warp operation 315 warps the EV-2 image 202 using the EV-2 alignment map 212 in order to align the EV-2 image 202 with the reference EV0 image 201a. The electronic device 101 can use any suitable warping technique or algorithm during the RGB warp operation 315. In some embodiments, the electronic device 101 performs a bilinear image warp independently for each of the R, G, and B channels.

The electronic device 101 performs a luma-chroma (YUV) conversion operation 320 on the reference EV0 image 201a and the warped EV-2 image 202. Using the YUV conversion operation 320, the electronic device 101 converts the reference EV0 image 201a and the EV-2 image 202 from the RGB domain into the YUV domain. In some embodiments, the YUV conversion operation 320 may be a twelve-bit operation (such as a twelve-bit depth per pixel) and may include the following operations.

$$Rg = \text{gamma}(R, b)$$
$$Gg = \text{gamma}(G, b)$$
$$Bg = \text{gamma}(B, b)$$
$$Y = 0.2126 * Rg + 0.7152 * Gg + 0.0722 * Bg$$
$$U = -0.09991 * Rg - 0.33609 * Gg + 0.436 * Bg$$
$$V = 0.615 * Rg - 0.55861 * Gg - 0.05639 * Bg$$

Here, R, G, and B represent the red, green, and blue values of each pixel in the RGB domain; b represents the number of bits of depth for each pixel (such as twelve); Rg, Gg, and Bg represent intermediate values obtained after the gamma operation; and Y, U, and V represent the Y (luma), U (blue chroma), and V (red chroma) values of each pixel in the YUV domain. Of course, these operations are examples, and other suitable conversion operations could be used.

Once the reference EV0 image 201a and the EV-2 image 202 have been processed using the operations described above, the electronic device 101 performs a shadow map operation 325 to generate an EV0 shadow map 341, performs a saturation map operation 330 to generate an EV0 saturation map 351, and performs an ME motion map operation 335 to generate an EV0 ME motion map 361. In the shadow map operation 325, the electronic device 101 creates a base map $M_D$ from the reference EV0 image 201a, such as by using the following operation.

$$M_D = \max\left(0, \min\left(1, 1 - \frac{\max(R, G, B) - 1}{3}\right)\right).$$

Here, R, G, and B are the red, green, and blue values of each pixel. The electronic device also filters the base map $M_D$, such as by using a filter $H_{3\times3}$, to generate a final EV0 shadow map 341, $\overline{M_D}$. In some cases, this can be expressed as follows.

$$\overline{M_D} = H_{3\times3} * M_D.$$

In the saturation map operation 330, the electronic device 101 creates a base map $M_S$ from the reference EV0 image 201a, such as by using the following operation.

$$M_S = \max\left(0, \min\left(1, \frac{\max(R, G, B) - 0.9 \times 2^{12}}{0.05 \times 2^{12}}\right)\right).$$

The electronic device also filters the base map $M_S$, such as by using a filter $H_{3\times3}$, to generate a final EV0 saturation map 351, $\overline{M_S}$. In some cases, this can be expressed as follows.

$$\overline{M_S} = H_{3\times3} * M_S.$$

In the ME motion map operation 335, the electronic device 101 determines the motion represented between the reference EV0 image 201a and the EV-2 image 202 in the YUV domain. In some embodiments, the motion map operation 335 is a pixel-wise operation that results in the EV0 ME motion map 361. The ME motion map operation 335 can represent any suitable technique or algorithm for generating a motion map.

Figure 4:
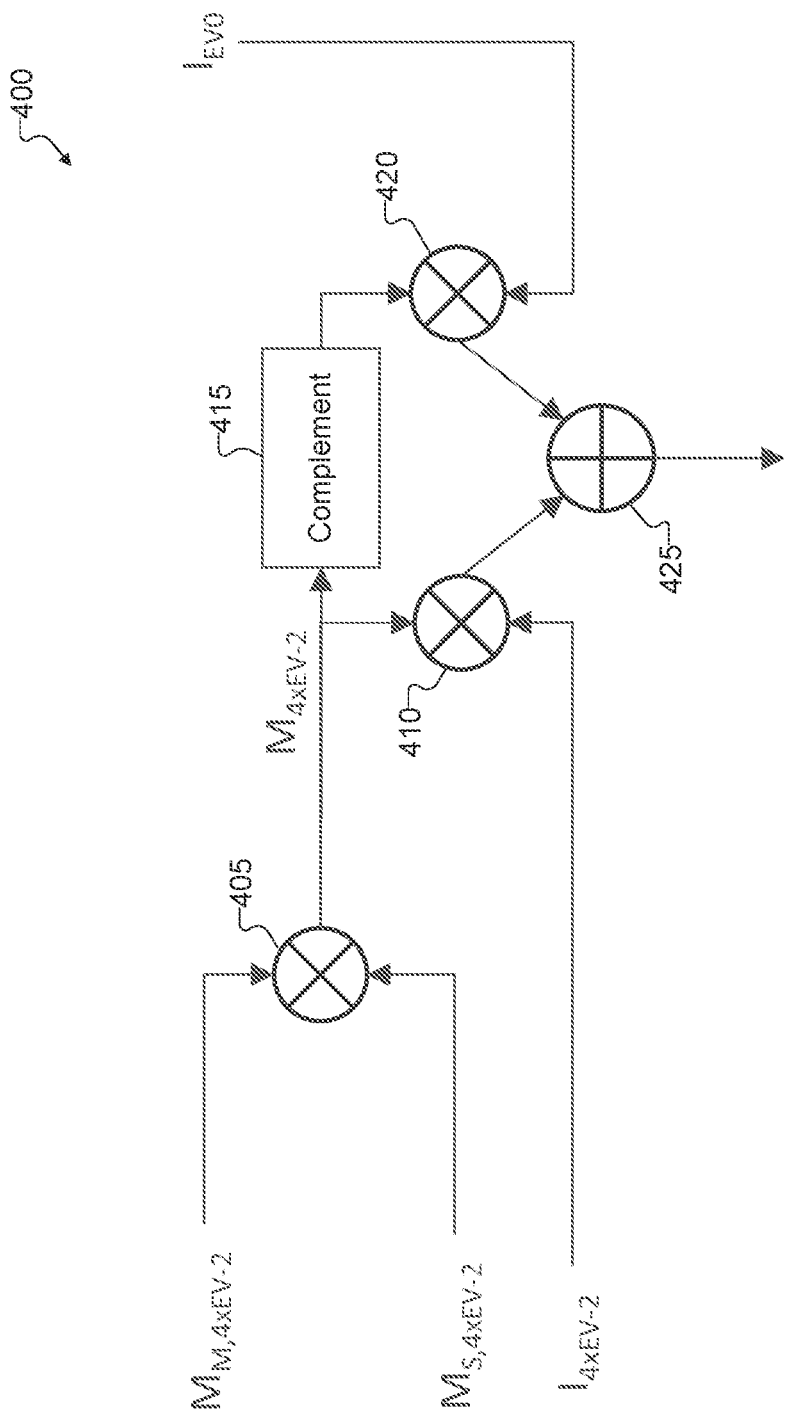
FIG. 4 illustrates an example ME blending operation that can be performed as part of a red-green-blue (RGB) blending operation in the process of FIG. 2 according to this disclosure.

The electronic device 101 performs an RGB blending operation 365 using the reference EV0 image 201a, the EV-2 image 202, and outputs from the saturation map operation 330 and the ME motion map operation 335 to generate a blended image 368. The RGB blending operation 365 is an ME blending operation, which may be performed independently for each of the R, G, and B channels. FIG. 4 illustrates an example ME blending operation 400 that can be performed as part of the RGB blending operation 365 according to this disclosure. The ME blending operation 400 recovers saturations from each color channel. As shown in FIG. 4, the motion map $M_{M.4\times EV\text{-}2}$ and the saturation map $M_{S.4\times EV\text{-}2}$ are combined using a multiplier operator 405 to generate a combined map $M_{4\times EV\text{-}2}$. The combined map $M_{4\times EV\text{-}2}$ is combined with the image frame $I_{4\times EV\text{-}2}$ using a multiplier operator 410. The combined map $M_{4\times EV\text{-}2}$ is also input to a complement operator 415, which performs a two's complement operation (such as 1-x) on the combined map $M_{4\times EV\text{-}2}$. The image frame $I_{EV0}$ is combined with the output of the complement operator 415 using a multiplier operator 420. That output is added to the output of the multiplier operator 410 using a summation operator 425. The output of the summation operator 425 represents one of the R, G, or B channels of the blended image 368.

Returning to FIG. 3, the electronic device 101 also performs an RGB warp operation 370 on the EV-4 image 203. Similar to the RGB warp operation 315, the RGB warp operation 370 warps the EV-4 image 203 using the EV-4 alignment map 214 in order to align the EV-4 image 203 with the reference EV0 image 201a. The electronic device 101 can use any suitable warping technique or algorithm during the RGB warp operation 370. In some embodiments, the electronic device 101 performs a bilinear image warp independently for each of the R, G, and B channels.

The electronic device 101 performs a YUV conversion operation 375 on the blended image 368 and the warped EV-4 image 203. Using the YUV conversion operation 375, the electronic device 101 converts the blended image 368 and the EV-4 image 203 from the RGB domain to the YUV domain. The YUV conversion operation 375 is similar to the YUV conversion operation 320. In some cases, however, the YUV conversion operation 375 may represent a fourteen-bit operation instead of a twelve-bit operation.

Once the blended image 368 and the EV-4 image 203 have been processed using the operations described above, the electronic device 101 performs a shadow map operation 380 to generate an EV-2 shadow map 342, performs a saturation map operation 385 to generate an EV-2 saturation map 352, and performs an ME motion map operation 390 to generate an EV-2 ME motion map 362. These operations 380, 385, 390 may be the same as or similar to the corresponding operations 325, 330, 335 discussed earlier, except the inputs and outputs are based on the EV-2 image 202 instead of the reference EV0 image 201a.

Turning again to FIG. 2, once the electronic device 101 has performed the ME analysis operation 220, the electronic device 101 performs a scheduling operation 230. In the scheduling operation 230, the electronic device 101 determines whether or not to perform an AI denoising operation 250 and, if so, on which frame(s) to perform the AI denoising operation 250. In some embodiments, for example, the electronic device 101 may only perform the AI denoising operation 250 when moving shadow and moving saturation metrics for the EV-2 image 202 and the EV-4 image 203 satisfy certain conditions as described in greater detail below.

Figure 5:
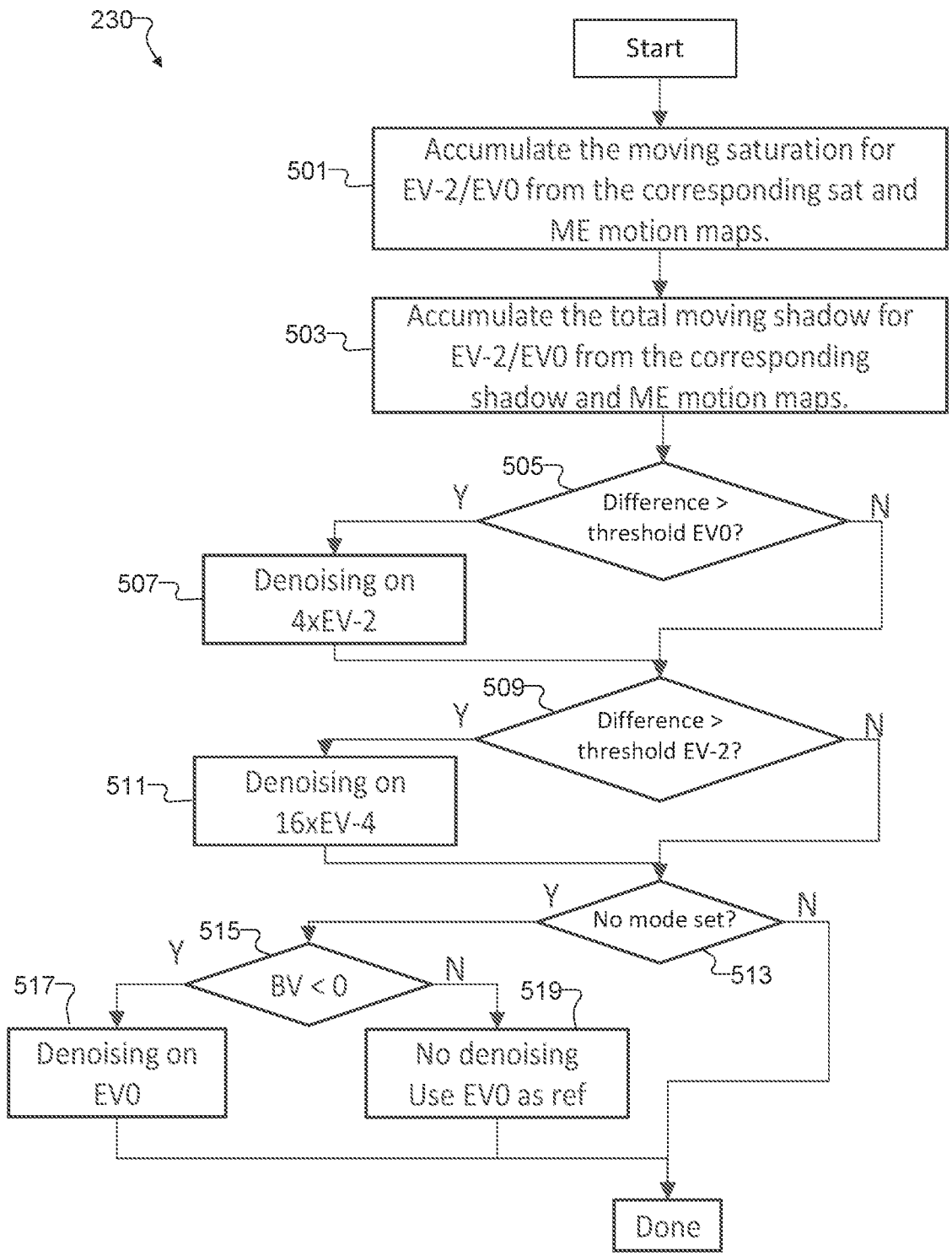
FIG. 5 illustrates example details of a scheduling operation in the process of FIG. 2 according to this disclosure.

FIG. 5 illustrates example details of the scheduling operation 230 according to this disclosure. As shown in FIG. 5, the scheduling operation 230 is performed as a process that includes the following operations. At operation 501, the electronic device 101 accumulates the total moving saturations for both the EV-2 image 202 and the reference EV0 image 201a (identified here as Acc_mov_sat_EV-2 and Acc_mov_sat_EV0, respectively) from the saturation maps 351 and 352 and the ME motion maps 361 and 362. In some embodiments, the operation 501 includes pixel-wise subtraction and multiplication operations on the saturation maps 351 and 352 and the ME motion maps 361 and 362. Any suitable algorithm or technique can be used here to determine Acc_mov_sat_EV-2 and Acc_mov_sat_EV0.

At operation 503, the electronic device 101 accumulates the total moving shadow for both the EV-2 image 202 and the reference EV0 image 201a (identified here as Acc_mov_shadow_EV-2 and Acc_mov_shadow_EV0 respectively) from the shadow maps 341 and 342 and the ME motion maps 361 and 362. In some embodiments, the operation 503 includes pixel-wise subtraction and multiplication operations on the shadow maps 341 and 342 and the ME motion maps 361 and 362. Any suitable algorithm or technique can be used here to determine Acc_mov_shadow_EV-2 and Acc_mov_shadow_EV0.

At operation 505, the electronic device 101 evaluates the validity of the following condition:

$$Acc\_mov\_sat\_EV0 - Acc\_mov\_shadow\_EV0 > threshold\_EV0$$

Here, threshold_EV0 is a specified threshold amount. In some embodiments, threshold_EV0 equals 1000, although other values are possible. If the condition in operation 505 is determined to be true, the process moves to operation 507. If the condition is determined to be false, the process moves to operation 509. At operation 507, the electronic device 101 determines that the AI denoising operation 250 will be performed on the EV-2 image 202, which is multiplied by four (4×EV-2).

At operation 509, the electronic device 101 evaluates the validity of the following condition:

$$Acc\_mov\_sat\_EV-2 - Acc\_mov\_shadow\_EV-2 > threshold\_EV-2$$

Here, threshold_EV-2 is a specified threshold amount. In some embodiments, threshold_EV-2 equals 2000, although other values are possible. If the condition in operation 509 is determined to be true, the process moves to operation 511. If the condition is determined to be false, the process moves to operation 513. At operation 511, the electronic device 101 determines that the AI denoising operation 250 will be performed on the EV-4 image 203, which is multiplied by sixteen (16×EV-4).

At operation 513, the electronic device 101 determines if no denoising mode has been set yet (such as whether or not the electronic device 101 has determined if the AI denoising operation 250 will be performed). If this condition is determined to be true, the process moves to operation 515. If the condition is determined to be false, the process is complete, and the AI denoising operation 250 will be performed as determined earlier in operation 507 or 511. At operation 515, the electronic device 101 determines whether a brightness value (BV) is less than zero. In some cases, the brightness value BV can be obtained from metadata associated with the input images 201-203. If this condition (BV<0) is determined to be true, the process moves to operation 517. If the condition is determined to be false, the process moves to operation 519. At operation 517, the electronic device 101 determines that the AI denoising operation 250 will be performed on the reference EV0 image 201a. The process for the scheduling operation 230 is complete. At operation 519, the electronic device 101 determines that no denoising will be performed, and the electronic device 101 will use the reference EV0 image 201a as a reference image. Again, the process for the scheduling operation 230 is complete.

Depending on the input image 201-203 that is selected as a reference image, the electronic device 101 may perform an update ME analysis operation 240. If the reference EV0 image 201a is chosen as a reference image, the update ME analysis operation 240 is not performed. However, if either the EV-2 image 202 or the EV-4 image 203 is selected as a reference image, the electronic device 101 performs the update ME analysis operation 240 to refine the saturation maps 351 and 352 and the ME motion maps 361 and 362 previously generated during the ME analysis operation 220.

Figure 6A:
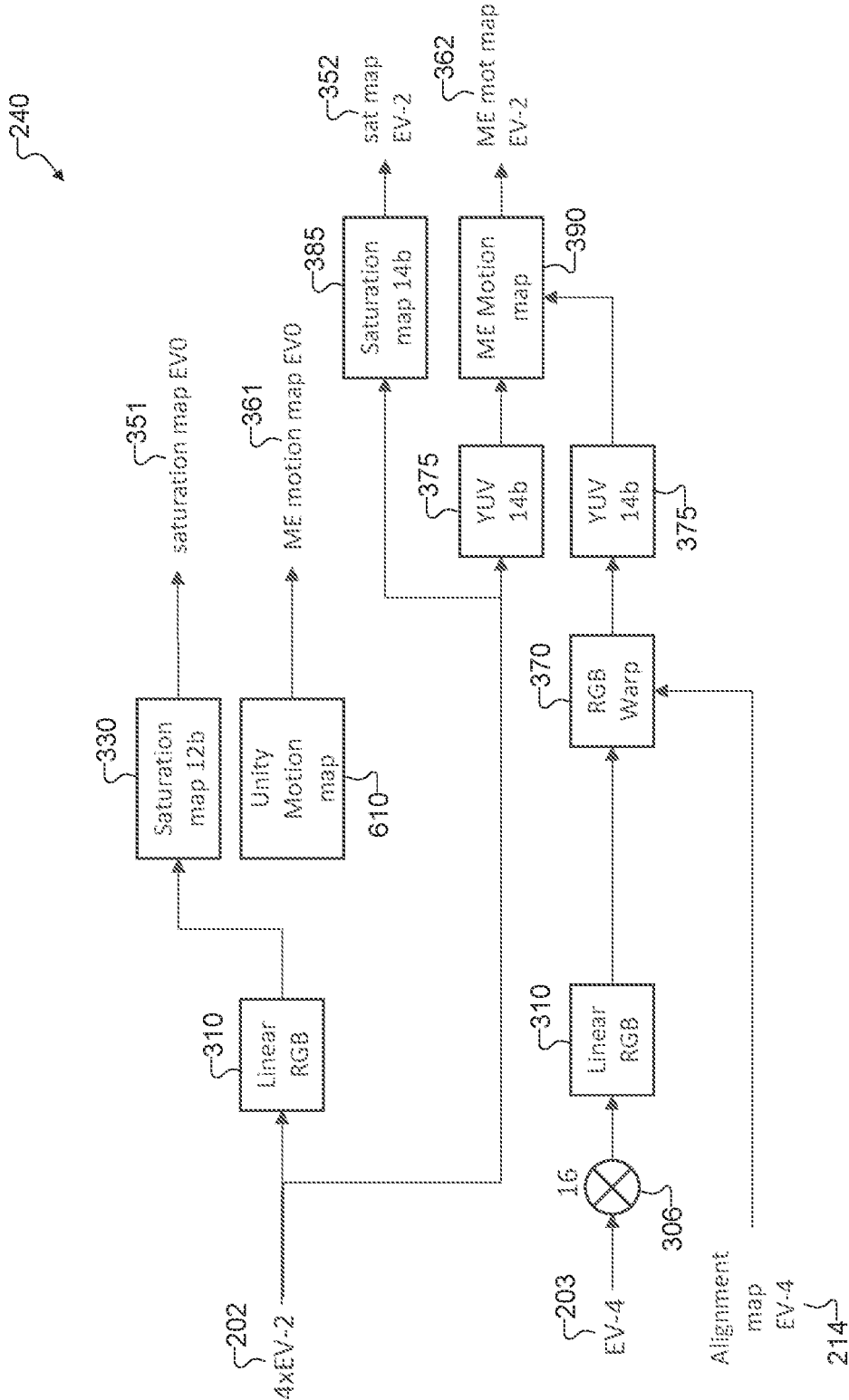
FIGS. 6A and 6B illustrate example details of an update ME analysis operation in the process of FIG. 2 according to this disclosure.
Figure 6B:
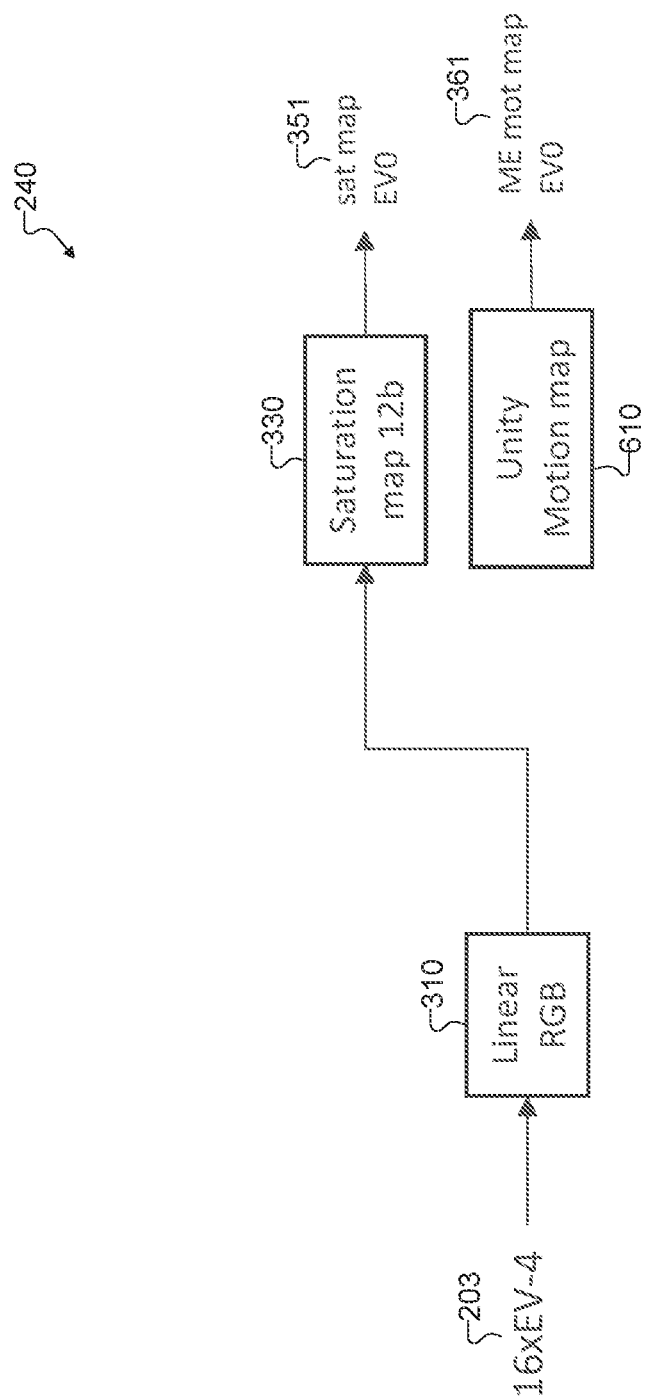

FIGS. 6A and 6B illustrate example details of the update ME analysis operation 240 according to this disclosure. In particular, FIG. 6A illustrates the update ME analysis operation 240 if the input to the AI denoising operation 250 (as determined in the scheduling operation 230) is the EV-2 image 202 multiplied by four (4×EV-2). FIG. 6B illustrates the update ME analysis operation 240 if the input to the AI denoising operation 250 is the EV-4 image 203 multiplied by sixteen (16×EV-4). If the input to the AI denoising operation 250 is the reference EV0 image 201a, the update ME analysis operation 240 does not need to be performed.

As shown in FIGS. 6A and 6B, the update ME analysis operation 240 can include multiple operations that are the same as or similar to corresponding operations of the ME analysis operation 220, including the multiplication operation 306, the linear RGB conversion operation 310, the RGB warp operation 370, the saturation map operation 330, the YUV conversion operation 375, the saturation map operation 385, and the ME motion map operation 390. Here, instead of the ME motion map operation 335, the update ME analysis operation 240 includes a unity motion map 610, which is a motion map that includes all ones. In the update ME analysis operation 240, the EV0 ME motion map 361 is set to the unity motion map 610.

Turning again to FIG. 2, once the electronic device 101 has performed the scheduling operation 230, the electronic device 101 may perform the AI denoising operation 250 and a deghosting operation 260. The AI denoising operation 250 is a machine learning-based denoising process to remove noise from one or more of the input images 201-203. Because of environment, transmission channel, and other factors, captured images are inevitably contaminated by noise during acquisition, compression, and transmission. This noise tends to be high-frequency noise that corrupts all portions of an image and affects both moving objects and stationary objects in a scene. However, edges and textures in images are also high-frequency components. Therefore, the AI denoising operation 250 can be performed to remove noise while preserving edges and textures in one or more of the input images 201-203. The AI denoising operation 250 can represent any suitable machine learning-based denoising process that can remove noise from one or more of the input images 201-203. Representative examples of machine learning-based denoising are described in Applicant's U.S. Pat. No. 10,944,914 (which is hereby incorporated by reference in its entirety).

Unlike some conventional image processing pipelines in which denoising is always performed, in the process 200, the electronic device 101 conditionally performs the AI denoising operation 250 depending on the outcome of the scheduling operation 230. As a result, the final image does not suffer from motion blur and detail loss because of over-filtering. Also, the electronic device 101 can perform the AI denoising operation 250 in parallel with the deghosting operation 260. Thus, in contrast to conventional image processing pipelines that perform deghosting after denoising, the process 200 uses the unprocessed (such as noisy) image for the deghosting operation 260 and uses the processed (such as denoised) image for the downstream blending operations (such as the SE blending operation 270 and the ME blending operation 280 described in greater detail below).

The deghost operation 260 can be performed to reduce or remove ghost artifacts in a final image of a scene, such as a high dynamic range (HDR) image. Ghost artifacts occur when an object in a scene (such as a person, cloud, etc.) moves as multi-frame images are captured. Ghost artifacts make multiple copies of the moving object and can also make the moving object look partially transparent, depending on the speed of the moving object.

Figure 7A:
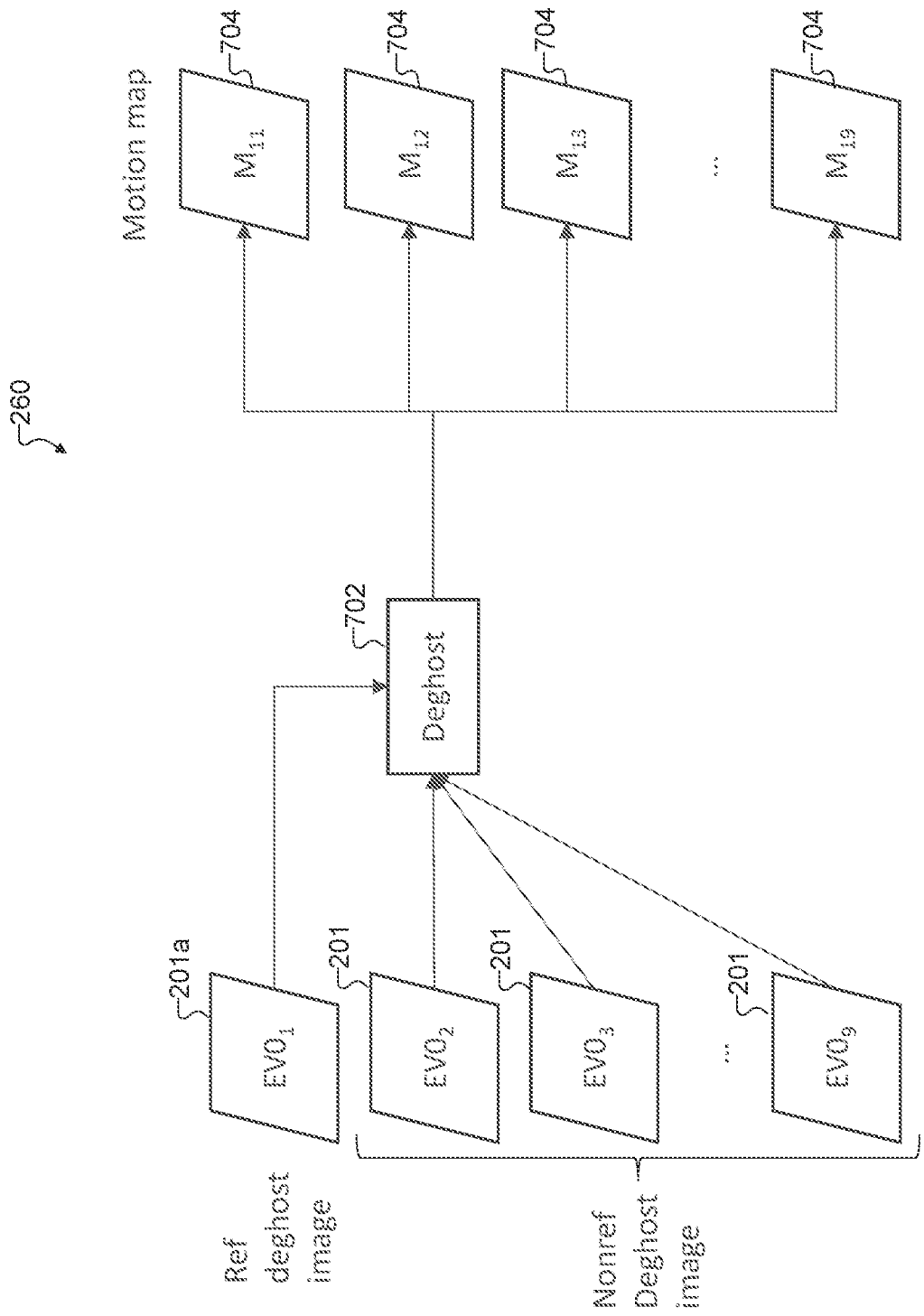
FIGS. 7A and 7B illustrate example details of a deghosting operation in the process of FIG. 2 according to this disclosure.
Figure 7B:
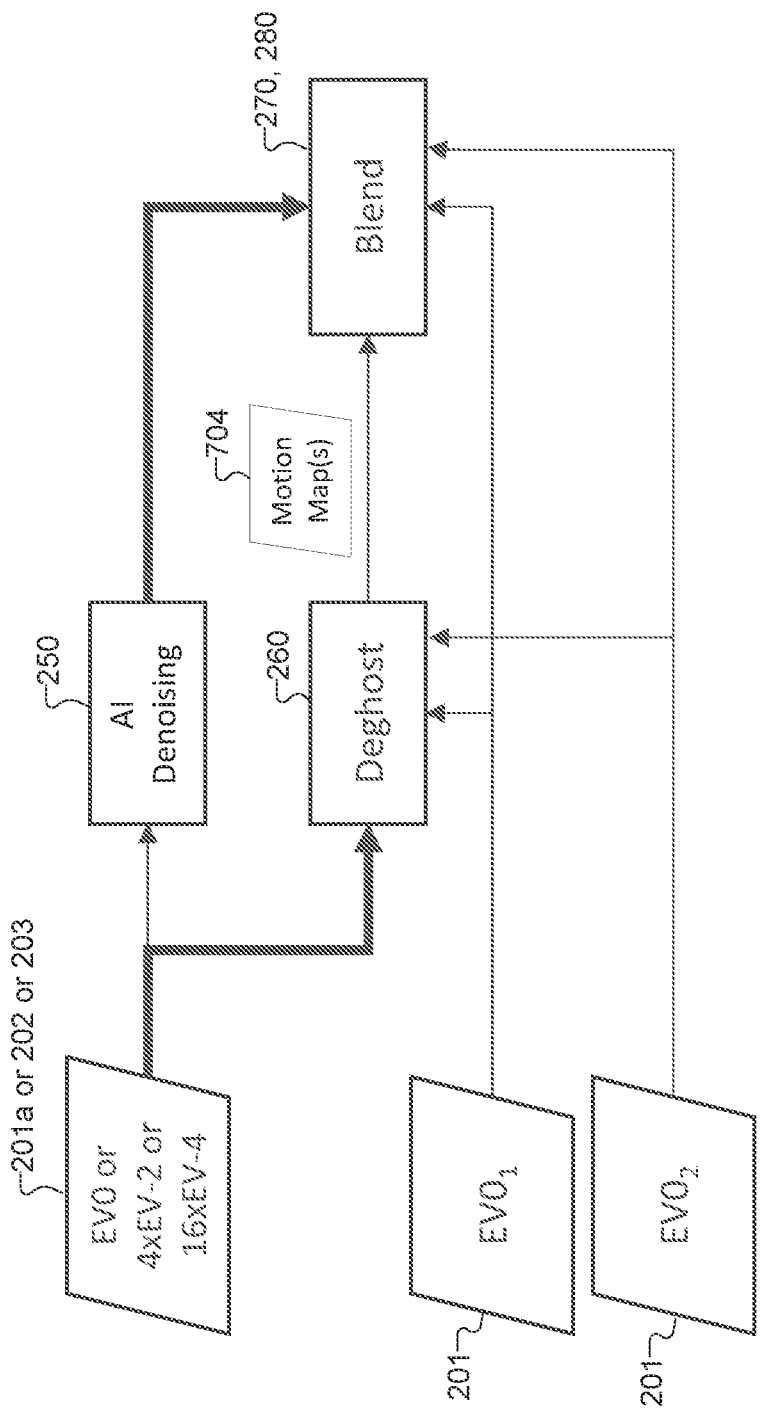

FIGS. 7A and 7B illustrate example details of the deghosting operation 260 according to this disclosure. In particular, FIG. 7A illustrates the deghosting operation 260 if the AI denoising operation 250 is not performed (as determined in the scheduling operation 230). FIG. 7B illustrates the deghosting operation 260 and the AI denoising operation 250 being performed (as determined in the scheduling operation 230).

As shown in FIG. 7A, the electronic device 101 obtains multiple EV0 images 201. Nine EV0 images 201 are represented in the figure, although there may be more or fewer EV0 images 201. The electronic device 101 selects the reference EV0 image 201a as the reference deghosting image, and the other EV0 images 201 are considered non-reference deghosting images. The electronic device 101 performs pairwise deghosting 702 between the reference EV0 image 201a and each of the non-reference EV0 images 201 to generate corresponding motion maps 704. For example, as shown in FIG. 7A, the deghosting 702 between the $EV0_1$ image and the $EV0_2$ image yields the motion map $M_{12}$. Similarly, the deghosting between the $EV0_1$ image and the $EV0_3$ image yields the motion map $M_{13}$. Note that the special motion map $M_{11}$ (representing the deghosting between the $EV0_1$ image and itself) has no motion in it. The motion maps 704 are subsequently used in the SE blending operation 270 to guide the blending process.

As shown in FIG. 7B, the electronic device 101 performs both the AI denoising operation 250 and the deghosting operation 260 based on decisions made in the scheduling operation 230. As discussed above, in the scheduling operation 230, the electronic device 101 can determine which image, among the reference EV0 image 201a, the EV-2 image 202, and the EV-4 image 203, should be processed (and used as a reference image). Other EV0 images 201 besides the reference EV0 image 201a are considered non-reference images for both deghosting and blending. As discussed above in conjunction with FIG. 7A, the deghosting operation 260 can include the pairwise deghosting 702, which generates corresponding motion maps 704 based on the image(s) 201a-203 that are input to the AI denoising operation 250 and the non-reference EV0 images 201.

In contrast to conventional image processing pipelines that use the same denoised image for both deghosting and blending, the process 200 uses the unprocessed (such as noisy) image for the deghosting operation 260 and uses the processed (such as denoised) image for the downstream blending operations (such as the SE blending operation 270 and the ME blending operation 280, described in greater detail below). As shown in FIG. 7B, the separation between the deghosting operation 260 and the blend image path enables parallel execution of the AI denoising operation 250 and the deghosting operation 260.

Returning to FIG. 2, the electronic device 101 performs the SE blending operation 270 and the ME blending operation 280 after the deghosting operation 260. The SE blending operation 270 and the ME blending operation 280 are performed using the outputs from the deghosting operation 260, the saturation maps 351 and 352, and the ME motion maps 361 and 362 as inputs. The result of the SE blending operation 270 and the ME blending operation 280 is one or more denoised blended images 290. The SE blending operation 270 and the ME blending operation 280 can represent any suitable SE blending and ME blending operations. Representative examples of SE blending and ME blending are described in Applicant's co-pending application U.S. patent application Ser. No. 17/587,309 (which is hereby incorporated by reference in its entirety).

Figure 8:
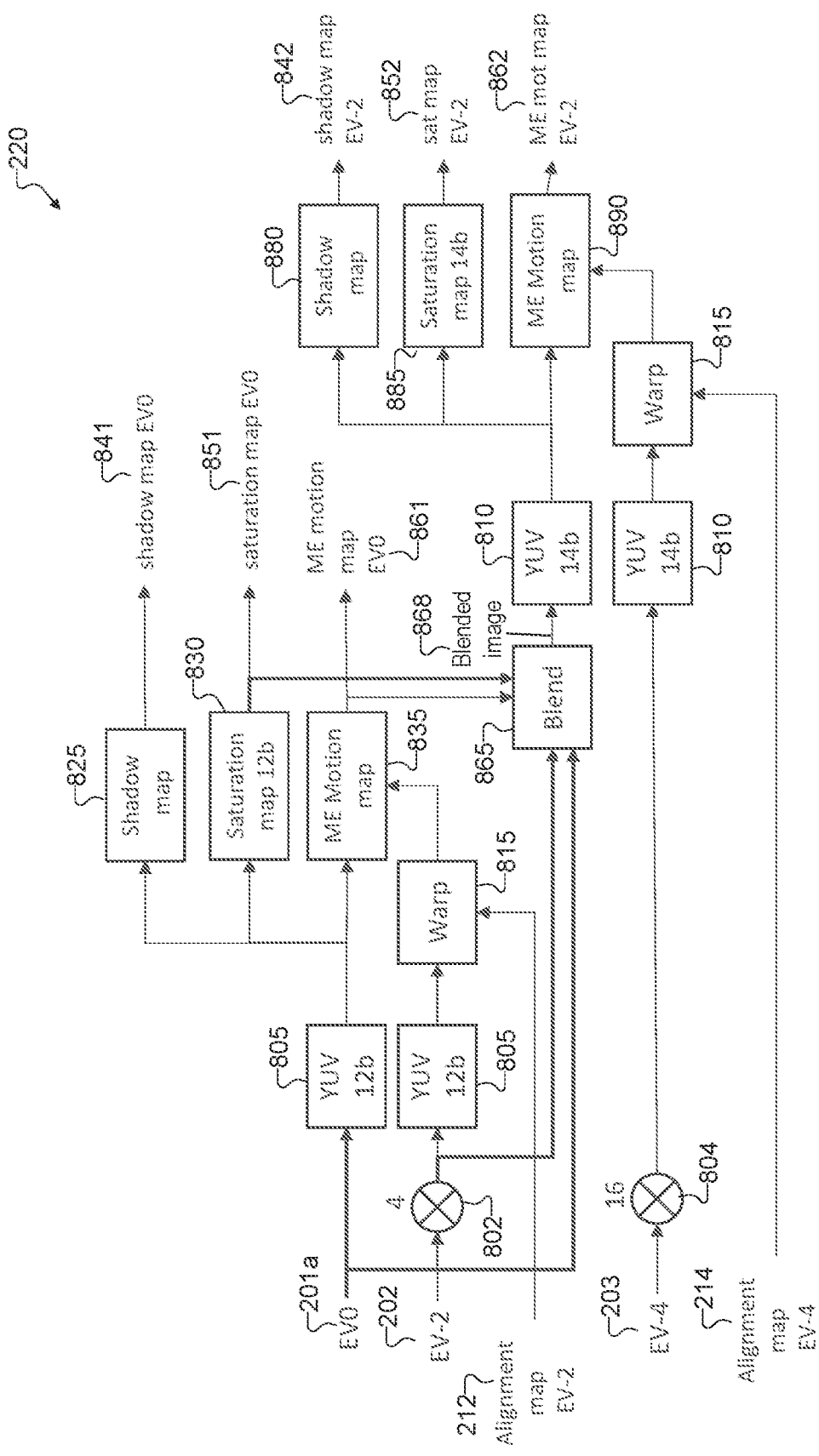
FIG. 8 illustrates another example of the ME analysis operation according to this disclosure.

FIG. 8 illustrates another example of the ME analysis operation 220 according to this disclosure. As shown in FIG. 8, the ME analysis operation 220 includes many elements and operations that are the same as or similar to corresponding elements and operations in FIG. 3. However, unlike FIG. 3 in which some of the operations are performed in the RGB domain, the ME analysis operation 220 in FIG. 8 is performed in the YUV domain without use of the RGB domain.

As shown in FIG. 8, the electronic device 101 performs multiplication operations 802 and 804 on the EV-2 image 202 and the EV-4 image 203, respectively, in order to substantially equalize the brightness levels among the input images 201-203. In this particular example, the EV-2 image 202 is multiplied by four in the multiplication operation 802, and the EV-4 image 203 is multiplied by sixteen in the multiplication operation 804. Once the electronic device 101 performs the multiplication operations 802 and 804 to equalize the brightness levels among the input images 201-203, the electronic device 101 performs a YUV conversion operation 805 on the reference EV0 image 201a and the EV-2 image 202. Using the YUV conversion operation 805, the electronic device 101 converts the reference EV0 image 201a and the EV-2 image 202 from the Bayer domain to the YUV domain. In some embodiments, the YUV conversion operation 805 is a twelve-bit operation. The electronic device 101 also performs a YUV conversion operation 810 on the EV-4 image 203. The YUV conversion operation 810 is similar to the YUV conversion operation 805 but may be a fourteen-bit operation instead of a twelve-bit operation.

Once the input images 201-203 have been converted to the YUV domain, the electronic device 101 performs a warp operation 815 on the EV-2 image 202 and the EV-4 image 203. The warp operation 815 warps the EV-2 image 202 using the EV-2 alignment map 212 in order to align the EV-2 image 202 with the reference EV0 image 201a. The warp operation 815 also warps the EV-4 image 203 using the EV-4 alignment map 214 in order to align the EV-4 image 203 with the reference EV0 image 201a. The electronic device 101 can use any suitable warping technique or algorithm during the warp operation 815. In some embodiments, the electronic device 101 performs a bilinear image warp independently for each of the Y, U, and V channels.

Once the reference EV0 image 201a and the EV-2 image 202 have been processed using the operations described above, the electronic device 101 performs a shadow map operation 825 to generate an EV0 shadow map 841, performs a saturation map operation 830 to generate an EV0 saturation map 851, and performs an ME motion map operation 835 to generate an EV0 ME motion map 861. In the shadow map operation 825, the electronic device 101 creates a base map $M_D$ from the reference EV0 image 201a, such as by using the following operation.

$$M_D = \max\left(0, \min\left(1, 1 - \frac{Y-1}{3}\right)\right)$$

Here, Y is the luma value of each pixel. The electronic device also filters the base map $M_D$, such as by using a filter $H_{3\times3}$, to generate a final EV0 shadow map 841, $\overline{M_D}$. In some cases, this can be expressed as follows.

$$\overline{M_D} = H_{3\times3} * M_D.$$

In the saturation map operation 830, the electronic device 101 creates a base map $M_S$ from the reference EV0 image 201a, such as by using the following operation.

$$M_S = \max\left(0, \min\left(1, \frac{Y - 0.9 \times 2^8}{0.05 \times 2^8}\right)\right).$$

The electronic device also filters the base map $M_S$, such as by using a filter $H_{3\times3}$, to generate a final EV0 saturation map 851, $\overline{M_S}$. In some cases, this can be expressed as follows.

$$\overline{M_S} = H_{3\times3} * M_S.$$

In the ME motion map operation 835, the electronic device 101 determines the motion represented between the reference EV0 image 201a and the EV-2 image 202 in the YUV domain. In some embodiments, the motion map operation 835 is a pixel-wise operation that results in the EV0 ME motion map 861. The ME motion map operation 835 can represent any suitable technique or algorithm for generating a motion map.

The electronic device 101 performs a Bayer blending operation 865 using the reference EV0 image 201a, the EV-2 image 202, and outputs from the saturation map operation 830 and the ME motion map operation 835 to generate a blended image 868. The Bayer blending operation 865 may be similar to the RGB blending operation 365 of FIG. 3 but is performed in the Bayer domain. In some embodiments, the Bayer blending operation 865 is a ME blending operation that may be performed independently for each of the Bayer planes.

Once the blended image 868 has been generated, the electronic device 101 performs a shadow map operation 880 to generate an EV-2 shadow map 842, performs a saturation map operation 885 to generate an EV-2 saturation map 852, and performs an ME motion map operation 890 to generate an EV-2 ME motion map 862. These operations 880, 885, 890 may be the same as or similar to the corresponding operations 825, 830, 835 discussed earlier, except the inputs and outputs are based on the EV-2 image 202 instead of the reference EV0 image 201a.

Figure 9A:
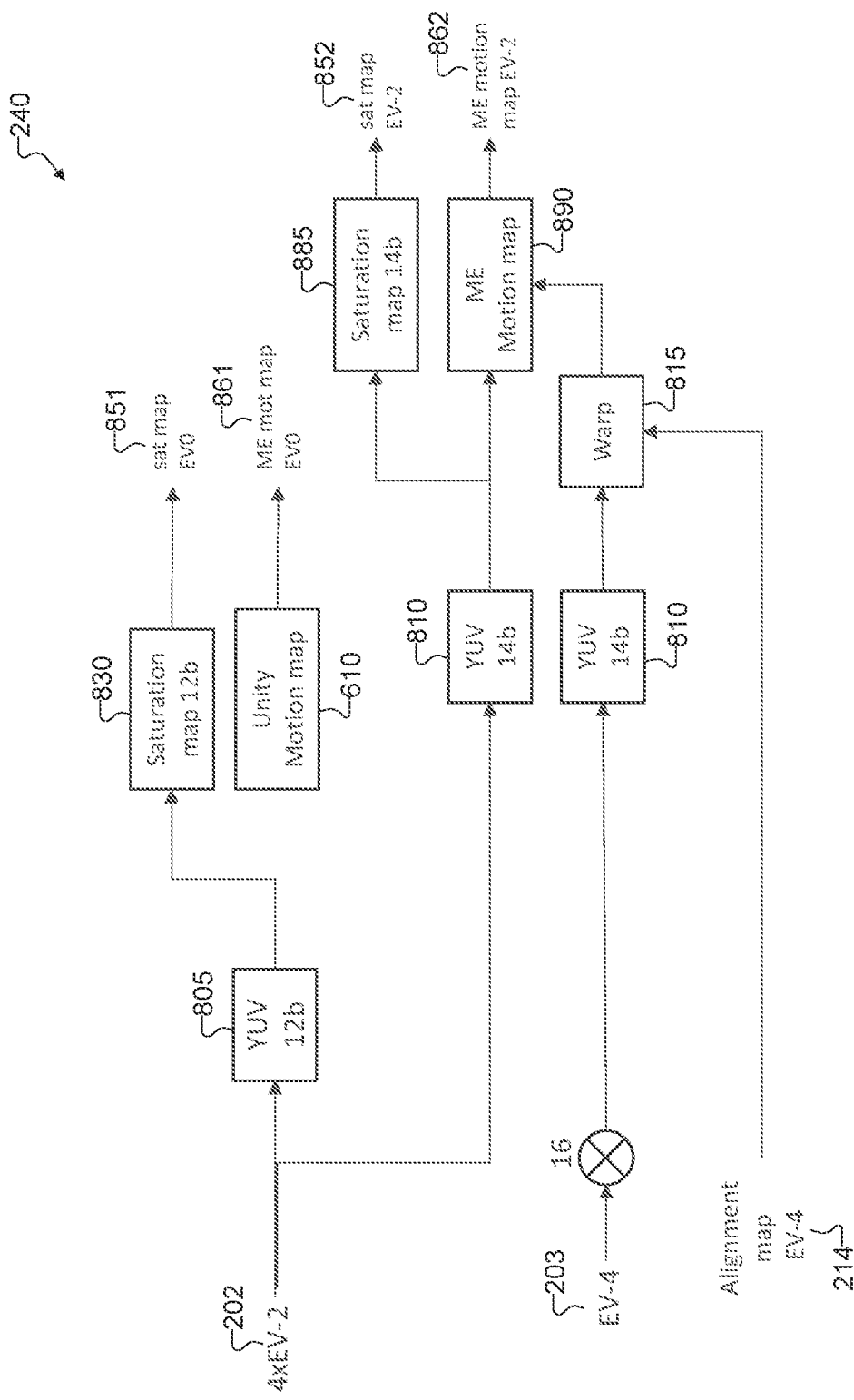
FIGS. 9A and 9B illustrate example details of another update ME analysis operation according to this disclosure.
Figure 9B:
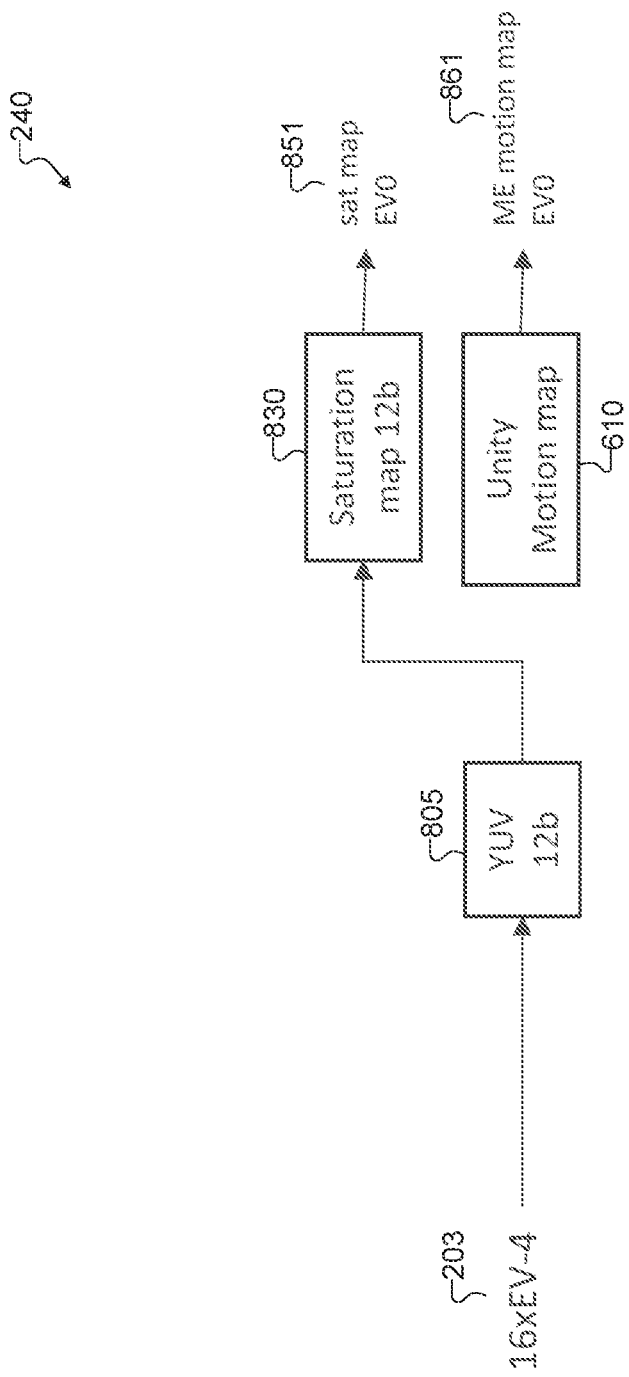

When the ME analysis operation 220 is performed in the YUV domain as shown in FIG. 8, the update ME analysis operation 240 is also performed in YUV domain. FIGS. 9A and 9B illustrate example details of another update ME analysis operation 240 according to this disclosure. The update ME analysis operation 240 shown in FIGS. 9A and 9B is similar to the corresponding ME analysis operation shown in FIGS. 6A and 6B. However, in FIGS. 9A and 9B, the update ME analysis operation 240 is performed in the YUV domain.

FIG. 9A illustrates the update ME analysis operation 240 if the input to the AI denoising operation 250 (as determined in the scheduling operation 230) is the EV-2 image 202 multiplied by four (4×EV-2). FIG. 9B illustrates the update ME analysis operation 240 if the input to the AI denoising operation 250 is the EV-4 image 203 multiplied by sixteen (16×EV-4). If the input to the AI denoising operation 250 is the reference EV0 image 201a, the update ME analysis operation 240 does not need to be performed. Many of the operations shown in FIGS. 9A and 9B are the same as corresponding operations of the ME analysis operation 220 shown in FIG. 8. Instead of the ME motion map operation 835, the update ME analysis operation 240 includes the unity motion map 610. In the update ME analysis operation 240, the EV0 ME motion map 861 is set to the unity motion map 610.

Figure 10:
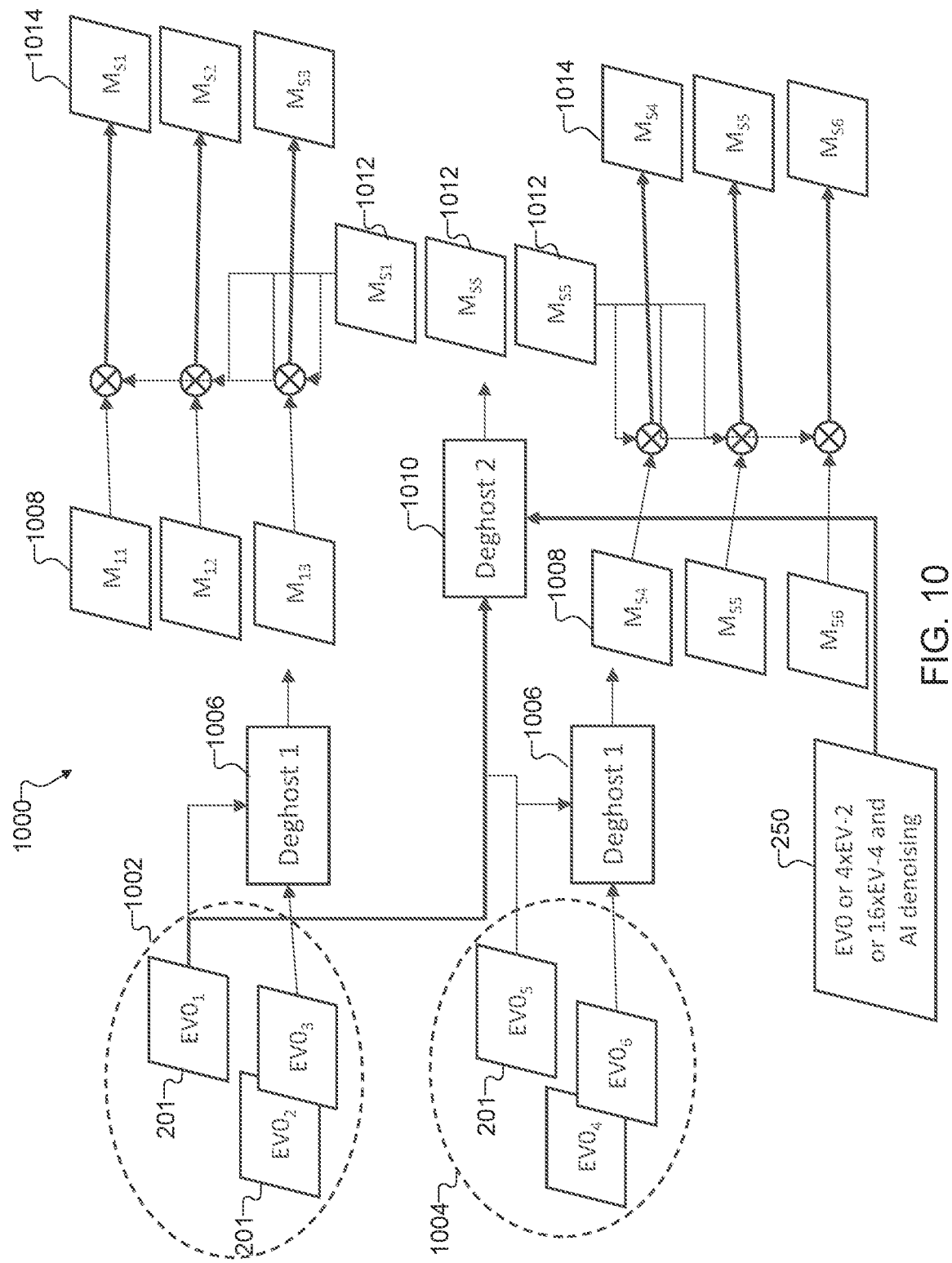
FIG. 10 illustrates an example group deghosting operation according to this disclosure.

FIG. 10 illustrates an example group deghosting operation 1000 according to this disclosure. The group deghosting operation 1000 can be performed as a part of, or as an alternative to, the deghosting operation 260 of FIG. 2. As shown in FIG. 10, the group deghosting operation 1000 is performed in multiple iterations. In the first iteration, subsets of the EV0 images 201 are grouped together (such as $EV0_1$, $EV0_2$, $EV0_3$ form a group 1002, and $EV0_4$, $EV0_5$, $EV0_6$ form another group 1004). One EV0 image 201 from each group is selected as the group reference (such as $EV0_1$ and $EV0_5$), and a deghosting operation 1006 is performed for each group 1002 and 1004. The deghosting operations 1006 can be performed in parallel with each other and with the AI denoising operation 250. The deghosting operations 1006 generate multiple motion maps 1008. An example motion map 1008 between $EV0_1$ and $EV0_2$ is labeled as $M_{12}$.

In the second iteration, another deghosting operation 1010 is performed with the AI denoised image as the reference. The reference frames from the group 1002 and 1004 of the first iteration (such as $EV0_1$ and $EV0_5$) are used as non-reference frames. The deghosting operation 1010 generates multiple motion maps 1012. An example motion map 1012 between the AI denoised image and $EV0_1$ is labeled as $M_{S1}$. Later, the motion maps 1008 and 1012 from the two iterations are combined to get the final maps 1014 (such as $M_{S1}$ is multiplied with $M_{12}$ to obtain $M_{S2}$).

Although FIG. 2 through 10 illustrate examples of a process 200 for scene-adaptive denoise scheduling and efficient deghosting and related details, various changes may be made to FIGS. 2 through 10. For example, while described as involving a specific sequence of operations, various operations of the techniques described with respect to FIGS. 2 through 10 could overlap, occur in parallel, occur in a different order, or occur any number of times (including zero times). Also, the specific operations shown in FIGS. 2 through 10 are examples only, and other techniques could be used to perform each of the operations shown in FIGS. 2 through 10.

Note that the operations and functions shown in or described with respect to FIGS. 2 through 10 can be implemented in an electronic device 101, server 106, or other device(s) in any suitable manner. For example, in some embodiments, the operations and functions shown in or described with respect to FIGS. 2 through 10 can be implemented or supported using one or more software applications or other software instructions that are executed by the processor 120 of the electronic device 101, server 106, or other device(s). In other embodiments, at least some of the operations and functions shown in or described with respect to FIGS. 2 through 10 can be implemented or supported using dedicated hardware components. In general, the operations and functions shown in or described with respect to FIGS. 2 through 10 can be performed using any suitable hardware or any suitable combination of hardware and software/firmware instructions.

Figure 11:
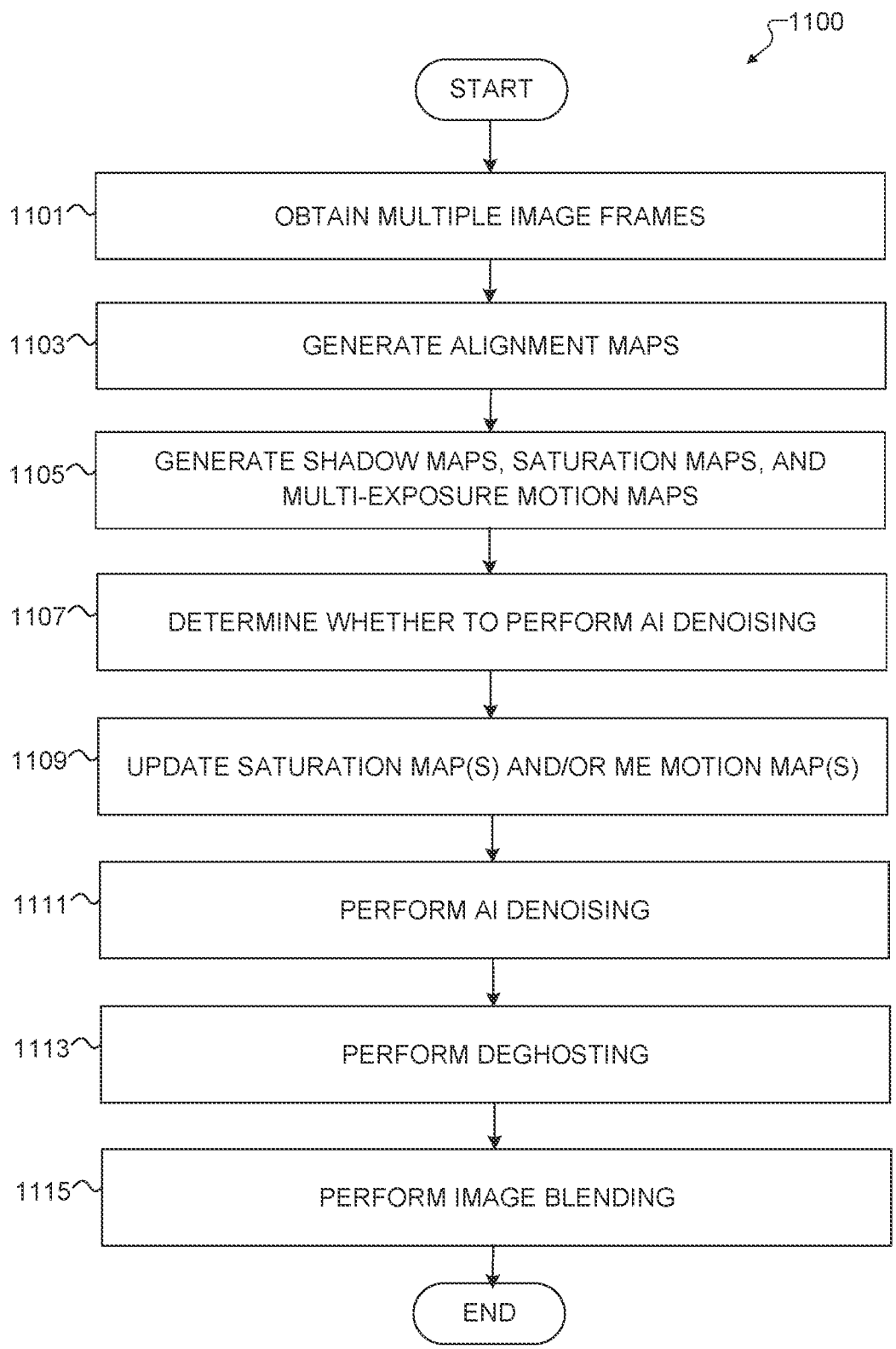
FIG. 11 illustrates an example method for scene-adaptive denoise scheduling and efficient deghosting according to this disclosure.

FIG. 11 illustrates an example method 1100 for scene-adaptive denoise scheduling and efficient deghosting according to this disclosure. For ease of explanation, the method 1100 shown in FIG. 11 is described as involving the use of the process 200 shown in FIGS. 2 and 3 and the electronic device 101 shown in FIG. 1. However, the method 1100 shown in FIG. 11 could be used with any other suitable process(es) and device(s).

As shown in FIG. 11, multiple image frames are obtained at step 1101. This could include, for example, the electronic device 101 obtaining the input images 201-203. Alignment maps for a first image frame having a first exposure level and a second image frame having a second exposure level different than the first exposure level are generated at step 1103. In some embodiments, the first exposure level is an EV-4 exposure level, the second exposure level is an EV-2 exposure level, and the third exposure level is an EV0 exposure level. This could include, for example, the electronic device 101 performing the alignment operation 210 using the EV-2 image 202 and the EV-4 image 203 to generate the EV-2 alignment map 212 and the EV-4 alignment map 214. For the second image frame and a third image frame having a third exposure level different than the first and second exposure levels, shadow maps, saturation maps, and ME motion maps are generated based on the alignment maps at step 1105. This could include, for example, the electronic device 101 performing the ME analysis operation 220 to generate the shadow maps 341 and 342, the saturation maps 351 and 352, and the ME motion maps 361 and 362.

Based on the shadow maps, the saturation maps, and the ME motion maps, it is determined whether to perform machine learning-based denoising and, if so, on which image frame or frames to perform the machine learning-based denoising at step 1107. This could include, for example, the electronic device 101 performing the AI scheduling operation 230 to determine if the AI denoising operation 250 is to be performed. At least one of the saturation maps and at least one of the ME motion maps are updated for at least one of the second and third image frames depending on the image frame or frames on which the machine learning-based denoising is to be performed at step 1109. This could include, for example, the electronic device 101 performing the update ME analysis operation 240 to update one or more of the saturation maps 351 and 352 and the ME motion maps 361 and 362.

Depending on the determination to perform machine learning-based denoising at step 1107, the machine learning-based denoising is performed on at least one of the first image frame, the second image frame, and the third image frame at step 1111. This could include, for example, the electronic device 101 performing the AI denoising operation 250 on at least one of the input images 101-103. A deghosting operation is performed at step 1113. The deghosting operation differs based on whether or not the machine learning-based denoising is performed. This could include, for example, the electronic device 101 performing the deghosting operation 260. Image blending is performed after the deghosting at step 1115. This could include, for example, the electronic device 101 performing the SE blending operation 270 and the ME blending operation 280 to generate one or more denoised and blended images 290.

Although FIG. 11 illustrates one example of a method 1100 for scene-adaptive denoise scheduling and efficient deghosting, various changes may be made to FIG. 11. For example, while shown as a series of steps, various steps in FIG. 11 could overlap, occur in parallel, occur in a different order, or occur any number of times.

Note that the various embodiments of this disclosure can be applied in a variety of use cases and achieve high accuracy. For example, experimental results show that measurement error in some embodiments is less than 5 mm for a measured distance of 1 m and less than 2 cm for a measured distance of 5 m. However, these values are for illustration only and can vary depending on the implementation. Also, some embodiments can be used to measure the distance between two devices, and an alert can be generated when the distance is too small (such as less than a threshold distance). This can be useful for social distancing in order to encourage devices (and thus users) to stay apart. The opposite determination can also be useful. For instance, in some embodiments, an alert can be generated when the distance is too large (such as greater than a threshold distance). This may be useful in various scenarios, such as when a smartphone is moving away from a connected smart watch, and an alert can be generated notifying the user (so the user does not forget the smart watch). In particular embodiments, when the watch is moving away from the phone (or vice versa), the phone or watch can automatically lock itself. In addition, in some embodiments, a device can build a profile of nearby devices to provide richer context including distances. For example, a device can derive its location from nearby devices if the distances and the locations of the nearby devices are known.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
generating alignment maps for a first image frame having a first exposure level and a second image frame having a second exposure level different than the first exposure level;
generating, for the second image frame and a third image frame having a third exposure level different than the first and second exposure levels, shadow maps, saturation maps, and multi-exposure (ME) motion maps based on the alignment maps;
determining, based on the shadow maps, the saturation maps, and the ME motion maps, whether to perform machine learning-based denoising and, if so, on which image frame or frames to perform the machine learning-based denoising; and
updating at least one of the saturation maps and at least one of the ME motion maps for at least one of the second and third image frames depending on the image frame or frames on which the machine learning-based denoising is to be performed.

2. The method of claim 1, wherein:
the first exposure level is an EV-4 exposure level;
the second exposure level is an EV-2 exposure level; and
the third exposure level is an EV0 exposure level.

3. The method of claim 1, further comprising:
performing the machine learning-based denoising on at least one of the first image frame, the second image frame, and the third image frame.

4. The method of claim 1, further comprising:
performing a deghosting operation that differs based on whether or not the machine learning-based denoising is performed.

5. The method of claim 4, wherein performing the deghosting operation comprises:
in response to determining that the machine learning-based denoising is not performed:
generating motion maps based on a single EV0 reference deghost image and multiple EV0 non-reference deghost images; and
performing a blending operation based on the motion maps; or
in response to determining that the machine learning-based denoising is performed:
generating motion maps based on image frames that are input to the machine learning-based denoising and multiple EV0 image frames; and
performing a blending operation based on the motion maps, the multiple EV0 image frames, and an output of the machine learning-based denoising.

6. The method of claim 5, wherein the blending operation comprises a single-exposure (SE) blending operation followed by an ME blending operation.

7. The method of claim 1, wherein generating the ME motion map for each of the second image frame and the third image frame comprises:
warping the first image frame and the second image frame;
converting the warped first image frame, the warped second image frame, and the third image frame to a luma-chroma (YUV) domain;
generating the ME motion map for the third image frame based on differences between the third image frame and the warped second image frame;
generating a blended image frame based on the third image frame and the warped second image frame; and
generating the ME motion map for the second image frame based on differences between the warped first image frame and the blended image frame.

8. An electronic device comprising:
at least one imaging sensor configured to capture multiple image frames of a scene; and
at least one processing device configured to:
generate alignment maps for a first image frame having a first exposure level and a second image frame having a second exposure level different than the first exposure level;
generate, for the second image frame and a third image frame having a third exposure level different than the first and second exposure levels, shadow maps, saturation maps, and multi-exposure (ME) motion maps based on the alignment maps;
determine, based on the shadow maps, the saturation maps, and the ME motion maps, whether to perform machine learning-based denoising and, if so, on which image frame or frames to perform the machine learning-based denoising; and
update at least one of the saturation maps and at least one of the ME motion maps for at least one of the second and third image frames depending on the image frame or frames on which the machine learning-based denoising is to be performed.

9. The electronic device of claim 8, wherein:
the first exposure level is an EV-4 exposure level;
the second exposure level is an EV-2 exposure level; and
the third exposure level is an EV0 exposure level.

10. The electronic device of claim 8, wherein the at least one processing device is further configured to perform the machine learning-based denoising on at least one of the first image frame, the second image frame, and the third image frame.

11. The electronic device of claim 8, wherein the at least one processing device is further configured to perform a deghosting operation that differs based on whether or not the machine learning-based denoising is performed.

12. The electronic device of claim 11, wherein, to perform the deghosting operation, the at least one processing device is configured to:
in response to determining that the machine learning-based denoising is not performed:
generate motion maps based on a single EV0 reference deghost image and multiple EV0 non-reference deghost images; and
perform a blending operation based on the motion maps; or
in response to determining that the machine learning-based denoising is performed:
generate motion maps based on image frames that are input to the machine learning-based denoising and multiple EV0 image frames; and
perform a blending operation based on the motion maps, the multiple EV0 image frames, and an output of the machine learning-based denoising.

13. The electronic device of claim 12, wherein the blending operation comprises a single-exposure (SE) blending operation followed by an ME blending operation.

14. The electronic device of claim 8, wherein, to generate the ME motion map for each of the second image frame and the third image frame, the at least one processing device is configured to:
  warp the first image frame and the second image frame;
  convert the warped first image frame, the warped second image frame, and the third image frame to a luma-chroma (YUV) domain;
  generate the ME motion map for the third image frame based on differences between the third image frame and the warped second image frame;
  generate a blended image frame based on the third image frame and the warped second image frame; and
  generate the ME motion map for the second image frame based on differences between the warped first image frame and the blended image frame.

15. A non-transitory machine-readable medium containing instructions that when executed cause at least one processor of an electronic device to:
  generate alignment maps for a first image frame having a first exposure level and a second image frame having a second exposure level different than the first exposure level;
  generate, for the second image frame and a third image frame having a third exposure level different than the first and second exposure levels, shadow maps, saturation maps, and multi-exposure (ME) motion maps based on the alignment maps;
  determine, based on the shadow maps, the saturation maps, and the ME motion maps, whether to perform machine learning-based denoising and, if so, on which image frame or frames to perform the machine learning-based denoising; and
  update at least one of the saturation maps and at least one of the ME motion maps for at least one of the second and third image frames depending on the image frame or frames on which the machine learning-based denoising is to be performed.

16. The non-transitory machine-readable medium of claim 15, wherein:
  the first exposure level is an EV-4 exposure level;
  the second exposure level is an EV-2 exposure level; and
  the third exposure level is an EV0 exposure level.

17. The non-transitory machine-readable medium of claim 15, wherein the instructions when executed further cause the at least one processor to perform the machine learning-based denoising on at least one of the first image frame, the second image frame, and the third image frame.

18. The non-transitory machine-readable medium of claim 15, wherein the instructions when executed further cause the at least one processor to perform a deghosting operation that differs based on whether or not the machine learning-based denoising is performed.

19. The non-transitory machine-readable medium of claim 18, wherein the instructions that when executed cause the at least one processor to perform the deghosting operation comprise instructions that when executed cause the at least one processor to:
  in response to determining that the machine learning-based denoising is not performed:
    generate motion maps based on a single EV0 reference deghost image and multiple EV0 non-reference deghost images; and
    perform a blending operation based on the motion maps; or
  in response to determining that the machine learning-based denoising is performed:
    generate motion maps based on image frames that are input to the machine learning-based denoising and multiple EV0 image frames; and
    perform a blending operation based on the motion maps, the multiple EV0 image frames, and an output of the machine learning-based denoising.

20. The non-transitory machine-readable medium of claim 19, wherein the blending operation comprises a single-exposure (SE) blending operation followed by an ME blending operation.

* * * * *